UNITED STATES PATENT OFFICE.

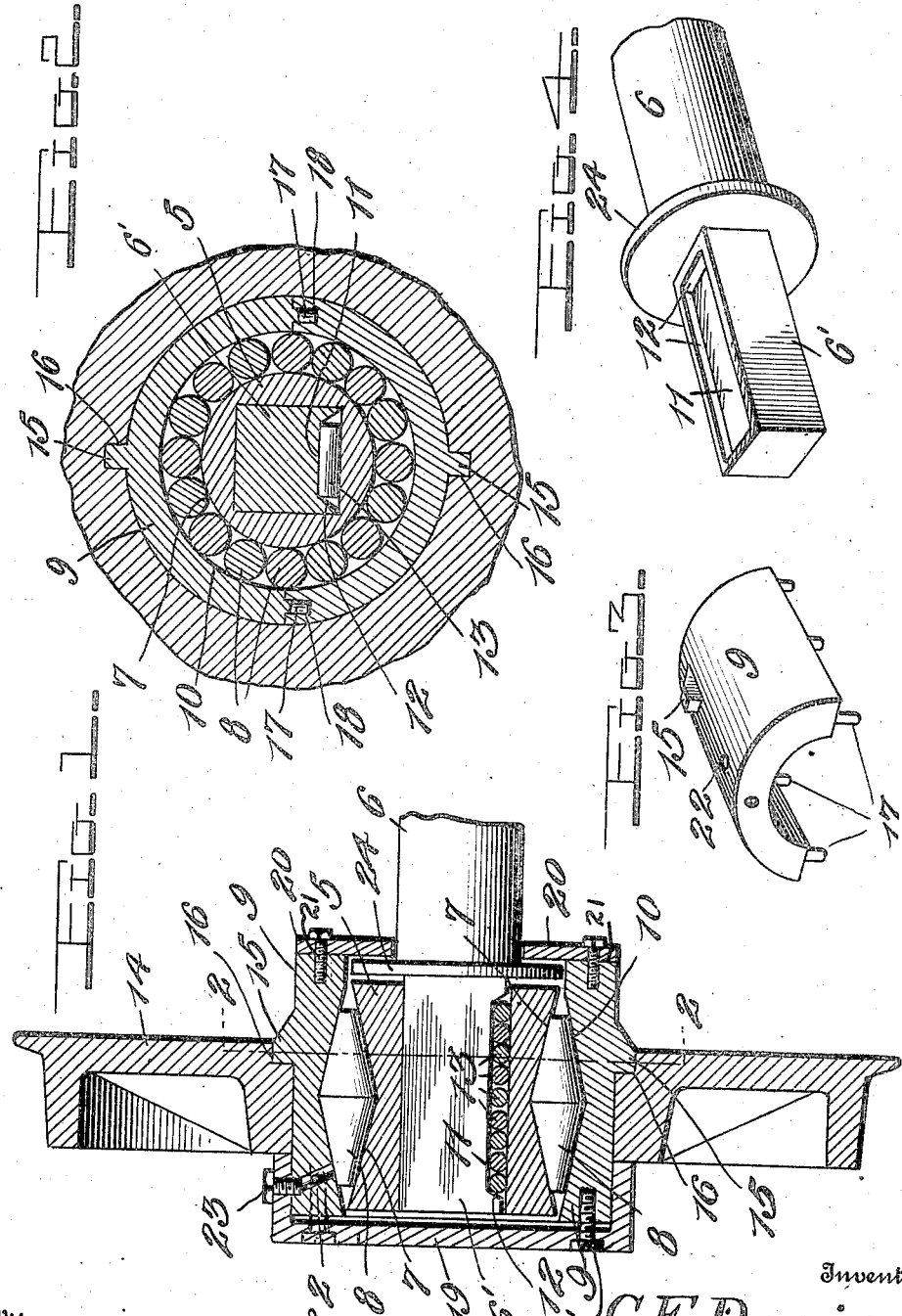

CHARLES E. DAVIS, OF DENVER, COLORADO.

ROLLER-BEARING.

1,018,697. Specification of Letters Patent. Patented Feb. 27, 1912.

Application filed June 7, 1911. Serial No. 631,751.

*To all whom it may concern:*

Be it known that I, CHARLES E. DAVIS, a citizen of the United States, residing at Denver, in the county of Denver and State of Colorado, have invented certain new and useful Improvements in Roller-Bearings, of which the following is a specification, reference being had to the accompanying drawings.

This invention relates to improvements in antifriction roller bearings for axles, shafts and other supports.

The invention has for its principal object the provision of a very simple and efficient bearing whereby friction between the axle and the hub of a wheel is eliminated, thereby prolonging the period of usefulness of the wheel.

Another object of the invention is to provide a bearing which may be easily and quickly assembled and arranged upon the axle, and means for assimilating the friction between the bearing and the axle caused by the longitudinal thrust of the latter.

Still another object of the invention is to provide a bearing which can be manufactured at a low cost and which is of such construction that the assemblage of the same in its operative position effectually overcomes all liability of the wheel accidentally moving off of the end of the axle.

With the above and other objects in view, the invention consists of the novel features of construction, combination and arrangement of parts hereinafter fully described and claimed, and illustrated in the accompanying drawings, in which—

Figure 1 is a longitudinal section through a bearing embodying my improvements; Fig. 2 is a section taken on the line 2—2 of Fig. 1; Fig. 3 is a detail perspective view of one of the bearing case sections; and Fig. 4 is a detail perspective view of the end of the axle.

The present invention is more particularly devised with a view to its use upon stationary axles or shafts, such as are commonly used upon locomotives and car trucks or other transporting vehicles. In the endeavor to eliminate, as far as possible, friction between the truck axle and the wheel, various forms of bearings have been devised, but they have proved inefficient and unsatisfactory to a great extent and generally very expensive to produce. By means of my invention I aim to eliminate these deficiencies and produce a bearing which is comparatively simple, and may be easily and quickly assembled and can be manufactured at an extremely low cost.

In the attainment of the above ends, I provide a main bearing element or body 5. This body is formed with a rectangular longitudinal bore to receive the squared end 6' of the axle 6. The body 5 is of a general cylindrical shape and its periphery is formed into a raceway 7 to receive the conical bearing rollers 8 which are adapted to be arranged upon said bearing body between the same and the case sections 9. These case sections are each of semicircular formation and their concave faces bear upon the conical rollers 8, said faces being formed with raceways 10 which are opposed to the raceway 7 of the body member 5. The surfaces of these raceways are inclined from the centers of the body member and the case sections so that when the parts are assembled said raceways converge to each end of the bearing as clearly shown in Fig. 1.

The squared portion 6' of the axle 6 is formed in its under side with a longitudinal groove or recess 11. The longitudinal and end walls of this recess are beveled or inclined as indicated at 12 so as to minimize the friction upon the rollers 13 which are arranged in said recess between the wall of the rectangular bore of the member 5 and the axle 6. These rollers are disposed at right angles to the main conical bearing rollers 8 and assimilate the greater part of the friction induced between the end of the axle and the member 5 in the longitudinal thrust of said axle.

The case sections 9 are adapted to be arranged in the hub of the wheel 14, the manner of such arrangement being more fully set forth in the following description. Each of the case sections 9 is formed adjacent to one end upon its periphery with a lug 15. These lugs are adapted to enter short recesses 16 formed in the hub of the wheel 14. The lugs 15 unite the case sections 9 and the wheel 14 so that they rotate together upon the conical bearings 8. One of the case sections 9 has formed upon its longitudinal edges and adjacent to each end, a tenon 17 which is adapted to engage in the mortises 18 provided in the longitudinal edges of the other of said case sections. A cap 19 is provided for engagement over one end of the bearing case and a plate 20 is arranged upon the axle 6 and is rigidly secured to the other end of the case sections by means of the bolts 21. The cap 19 has an opening therein which is adapted to register with an oil hole 22 provided in one of the case sections for the purpose of supplying a suitable oil or lubricant to the bearings. A threaded plug or screw 23 is adapted to be threaded into the opening in the cap and into the outer end of the oil hole to close the same and prevent dust or dirt accumulating upon the bearing rollers and interfering with the proper operation of the device. Suitable bolts 19' extend through the cap 19 and are threaded into the case sections 9 whereby said cap is rigidly secured to the wheel hub. The plate 20 is formed in two sections so that it may be readily placed in position upon the axle 6 or removed therefrom without disassembling the other parts. A collar 24 is formed upon the end of the cylindrical portion of the axle and is disposed between the plate sections 20 and the inner end of the body 5. This collar limits the longitudinal movement of said axle.

In assembling the bearing, the body member 5 of the bearing is first positioned upon the squared end 6' of the axle. The main bearing rollers 8 are then disposed in the raceways of the case sections 9 and said sections positioned upon the bearing member 5, the tenons 17 fitting into the mortises 18 and thus preventing relative longitudinal movement of said sections while the wheel 14 is being fitted upon the same. The wheel is then disposed upon the bearing, the casing sections fitting snugly in the bore of the hub and the lugs 15 entering the recesses 16 therein. The cap 19 is then arranged in position and secured upon the bearings by means of the screws 19. The assembling of the device is completed by rigidly securing the plate 20 to the inner ends of the bearing sections by means of the bolts 21. The rollers 13 are of course positioned in the recess 11 as the body member 5 is moved inwardly upon the end of the axle 6.

From the foregoing it will be seen that I have provided a roller bearing which is of extremely simple construction and one which will be highly efficient in practical use. All friction between the wheel and the bearing is eliminated and the friction caused between the bearing and the axle in the longitudinal movement of the latter is to a large extent taken up by the rollers 13. The ends of these rollers have no frictional contact with the bore of the bearing member 5 or with the axle so that wear upon the same is rendered is possible. Thus their period of service is materially lengthened. They may, however, be readily replaced when too far worn to be of further use. As the bearing comprises but few parts, it will be apparent that the device is extremely durable in use and may be manufactured at an extremely low cost.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. The combination with an axle and a wheel mounted thereon, of a bearing for said wheel comprising a body member having a rectangular bore, the end of said axle being squared to be received in said bore, said body member being formed with a peripheral raceway having inclined faces, a case formed in two sections provided with a raceway, said case sections being adapted to be arranged upon the body member, conical bearing rollers arranged in the raceways of the body member and case, one face of the squared portion of the axle having a longitudinal recess therein, anti-friction rollers arranged in said recess to eliminate friction between the axle and the body member in the longitudinal thrust of the axle, means for rigidly securing the case sections in the hub of the vehicle wheel for rotation therewith, and additional means for uniting said case sections and preventing their relative movement.

2. The combination with an axle and a wheel mounted thereon, of a bearing for said wheel comprising a body member provided with a bore to receive the end of the axle, said axle being longitudinally movable in said member, said body member being provided with a raceway in its periphery, a case formed in two sections adapted to be arranged upon the body member, said case sections being provided upon their inner faces with a raceway opposed to the raceway of the body member, bearing rollers arranged in the raceways of the body member and case, said axle being provided with a longitudinal recess in its end, the longitudinal edges of said recesses being outwardly inclined, and a plurality of anti-friction rollers arranged in said recess and having their ends spaced from the inclined edges of the recess to reduce friction upon said rollers to a minimum.

In testimony whereof I hereunto affix my signature in the presence of two witnesses.

CHARLES E. DAVIS.

Witnesses:
W. H. BURNSIDE,
W. H. TUCKER.